(12) United States Patent
Yoon et al.

(10) Patent No.: US 11,651,897 B2
(45) Date of Patent: May 16, 2023

(54) ELECTRONIC COMPONENT

(71) Applicant: SAMSUNG ELECTRO-MECHANICS CO., LTD., Suwon-si (KR)

(72) Inventors: Chan Yoon, Suwon-si (KR); Sang Soo Park, Suwon-si (KR); Hwi Dae Kim, Suwon-si (KR); Woo Chul Shin, Suwon-si (KR); Ji Hong Jo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 101 days.

(21) Appl. No.: 17/173,526

(22) Filed: Feb. 11, 2021

(65) Prior Publication Data

US 2021/0166878 A1 Jun. 3, 2021

Related U.S. Application Data

(63) Continuation of application No. 16/674,315, filed on Nov. 5, 2019, now Pat. No. 10,957,486.

(30) Foreign Application Priority Data

Jun. 24, 2019 (KR) .................. 10-2019-0074817

(51) Int. Cl.
*H01G 4/232* (2006.01)
*H01G 4/30* (2006.01)

(52) U.S. Cl.
CPC ............ *H01G 4/232* (2013.01); *H01G 4/30* (2013.01)

(58) Field of Classification Search
CPC .................. H02G 4/232; H01G 4/30
(Continued)

(56) References Cited

U.S. PATENT DOCUMENTS 4,312,027 A 1/1982 Stockman
6,903,919 B2 6/2005 Kayatani et al.
(Continued)

FOREIGN PATENT DOCUMENTS

CN 1574129 A 2/2005
CN 104465090 A 3/2015
(Continued)

OTHER PUBLICATIONS

U.S. Notice of Allowance dated Feb. 5, 2021 issued in U.S. Appl. No. 16/674,315.
(Continued)

*Primary Examiner* — Sherman Ng
(74) *Attorney, Agent, or Firm* — Morgan, Lewis & Bockius LLP

(57) ABSTRACT

An electronic component includes a capacitor body having alternately stacked first and second internal electrodes with dielectric layers therebetween, the capacitor body having first to sixth surfaces and the first internal electrodes and the second internal electrodes being exposed through the third surface and the fourth surface, respectively. First and second external electrodes are disposed respectively on the third and fourth surfaces of the body and respectively connected to the first and second internal electrodes. A shielding layer includes a cap portion disposed on the second surface of the capacitor body and a side wall portion disposed on the third, fourth, fifth, and sixth surfaces of the capacitor body, and an insulating layer is disposed between the capacitor body and the shielding layer. The shielding layer consists of first and second shielding layers offset from each other in a direction connecting the third and fourth surfaces.

30 Claims, 7 Drawing Sheets

(58) Field of Classification Search
USPC .......................................................... 361/272
See application file for complete search history.

(56) References Cited

U.S. PATENT DOCUMENTS

| | | |
|---|---|---|
| 9,818,511 B2 | 11/2017 | Mori et al. |
| 9,818,543 B2 | 11/2017 | Tahara et al. |
| 2004/0240146 A1 | 12/2004 | Kayatani |
| 2011/0002082 A1 | 1/2011 | Bultitude et al. |
| 2013/0020905 A1 | 1/2013 | Sawada |
| 2015/0084487 A1* | 3/2015 | Mori ............... H01G 4/232 336/200 |
| 2016/0234979 A1 | 8/2016 | Lee |
| 2017/0154731 A1 | 6/2017 | Tahara |
| 2018/0130603 A1 | 5/2018 | Chong et al. |
| 2018/0315545 A1 | 11/2018 | Kusumoto |
| 2019/0066923 A1 | 2/2019 | Jung et al. |

FOREIGN PATENT DOCUMENTS

| | | |
|---|---|---|
| CN | 107045937 A | 8/2017 |
| CN | 206421935 U | 8/2017 |
| CN | 109461578 A | 3/2019 |
| KR | 10-2018-0050004 A | 5/2018 |
| WO | 2013183632 A1 | 12/2013 |

OTHER PUBLICATIONS

Chinese Office Action dated Aug. 8, 2022, issued in corresponding Chinese Patent Application No. 202010009940.2.

* cited by examiner

ELECTRONIC COMPONENT

CROSS-REFERENCE TO RELATED APPLICATION(S)

This application is a continuation of U.S. patent application Ser. No. 16/674,315, filed on Nov. 5, 2019, which claims benefit of priority to Korean Patent Application No. 10-2019-0074817 filed on Jun. 24, 2019, the disclosures of which are incorporated herein by reference in their entireties.

BACKGROUND

1. Field

The present disclosure relates to an electronic component.

2. Description of Related Art

Common electronic components employing ceramic materials include capacitors, inductors, piezoelectric elements, varistors or thermistors, and the like.

Electronic devices in which such electronic components are used are gradually becoming highly efficient and miniaturized. Accordingly, electronic components used in the electronic devices are also miniaturized and highly efficient.

In particular, due to demand for mobile phones which are highly efficient and thinner, densification and multilayer lamination of substrate mounting are sustainedly progressing. In this regard, an RF performance in a set may be reduced due to electromagnetic interference (EMI) noise, and a radiated magnetic field may have a devastating effect on a low power signal such as GPS or Wi-Fi.

Accordingly, there has been increasing demand for a technique for removing or shielding a source of noise such as EMI.

A conventional EMI-shielding technique involves mounting an electronic component on a substrate and surrounding both electronic component and substrates with a shield can. This causes an increased volume not only in a Z direction but also in X and Y directions, thereby not conforming to a current trend for the densification and multilayer lamination in substrate mounting.

In such an aspect, demand exists for an effective technique for facilitating shielding of the EMI noise of an electronic component itself.

SUMMARY

An aspect of the present disclosure is to provide an electronic component capable of substantially retaining component characteristics while reducing leakage flux.

Another aspect is to provide an electronic component capable of preventing a short between a solder and an EMI-shielding layer when mounting the electronic component.

According to an aspect of the present disclosure, an electronic component includes a capacitor body having alternately stacked first internal electrodes and second internal electrodes with dielectric layers therebetween, and a first surface and a second surface opposing each other, a third surface and a fourth surface connected to the first and second surfaces and opposing each other, and a fifth surface and a sixth surface connected to the first to fourth surfaces and opposing each other, the first internal electrodes and the second internal electrodes being exposed through the third surface and the fourth surface, respectively. First and second external electrodes respectively extend from the third and fourth surfaces of the body to respective portions of the first surface and are respectively connected to the first and second internal electrodes. A shielding layer includes a cap portion disposed on the second surface of the capacitor body and a side wall portion disposed on the third, fourth, fifth and sixth surfaces of the capacitor body. An insulating layer is disposed between the capacitor body and the shielding layer. The shielding layer includes first and second shielding layers offset from each other in a direction connecting the third and fourth surfaces.

In an example embodiment, the first and second shielding layers may be spaced part from each other by a gap portion disposed between the first and second shielding layers, and an insulating film may be disposed in the gap portion.

In an example embodiment, the first and second shielding layers may be spaced part from each other by a gap portion disposed between the first and second shielding layers, and an oxide film may be disposed in the gap portion.

In an example embodiment, the electronic component may further include a cover layer disposed on the shielding layer and formed of an insulating material.

In an example embodiment, the first and second external electrodes may include first and second connection portions respectively disposed on the third and fourth surfaces of the capacitor body and respectively connected to the first and second internal electrodes, and first and second band portions respectively extending from the first and second connection portions to the respective portions of the first surface of the capacitor body.

In an example embodiment, the second surface of the capacitor body is free of the first and second external electrodes, and the insulating layer and the shielding layer may have flat surfaces overlaying the second surface.

In an example embodiment, the first and second band portions may further extend to respective portions of the second, fifth, and sixth surfaces of the capacitor body.

In an example embodiment, the respective portions of the second, fifth, and sixth surfaces of the capacitor body having the first and second band portions extending thereon may be overlapped by the insulating layer and the shielding layer.

In an example embodiment, the insulating layer may be formed of an adhesive layer.

According to an aspect of the present disclosure, an electronic component includes a capacitor body having alternately stacked first internal electrodes and second internal electrodes with dielectric layers therebetween, first and second external electrodes respectively connected to the first and second internal electrodes and disposed to be spaced apart from each other in a length direction on a first surface of the capacitor body, and first and second shielding layers disposed on respective portions of the capacitor body to be spaced apart from each other in the length direction.

In an example embodiment, the electronic component further may include an insulating layer disposed between the capacitor body and the first and second shielding layers.

In an example embodiment, the first and second shielding layers may include at least one of a conductive material and a magnetic material.

In an example embodiment, the first and second shielding layers may include a conductive material and a magnetic material.

In an example embodiment, the first and second shielding layers may jointly extend on all surfaces of the capacitor body other than the first surface of the capacitor body.

In an example embodiment, the first and second shielding layers may be spaced apart from each other by a gap, and an insulator may fill the gap between the first and second shielding layers.

In an example embodiment, the first shielding layer may overlap with portions of the first external electrode, and the second shielding layer may overlap with portions of the second external electrode.

In an example embodiment, all portions of surfaces of the capacitor body overlapped by the first shielding layer may be spaced away from the second external electrode, and all portions of surfaces of the capacitor body overlapped by the second shielding layer may be spaced away from the first external electrode.

In an example embodiment, the first and second shielding layers may be spaced apart from each other by a gap, and all portions of surfaces of the capacitor body overlapped by the gap may be spaced apart from the first and second external electrodes.

In an example embodiment, the capacitor body may have a second surface opposing the first surface, third and fourth surfaces opposing each other in the length direction and connecting the first and second surfaces, and fifth and sixth surfaces opposing each other and connecting the first, second, third, and fourth surfaces, and insulating film filling the gap between the first and second shielding layers may extend across the second surface and along the fifth and sixth surfaces.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
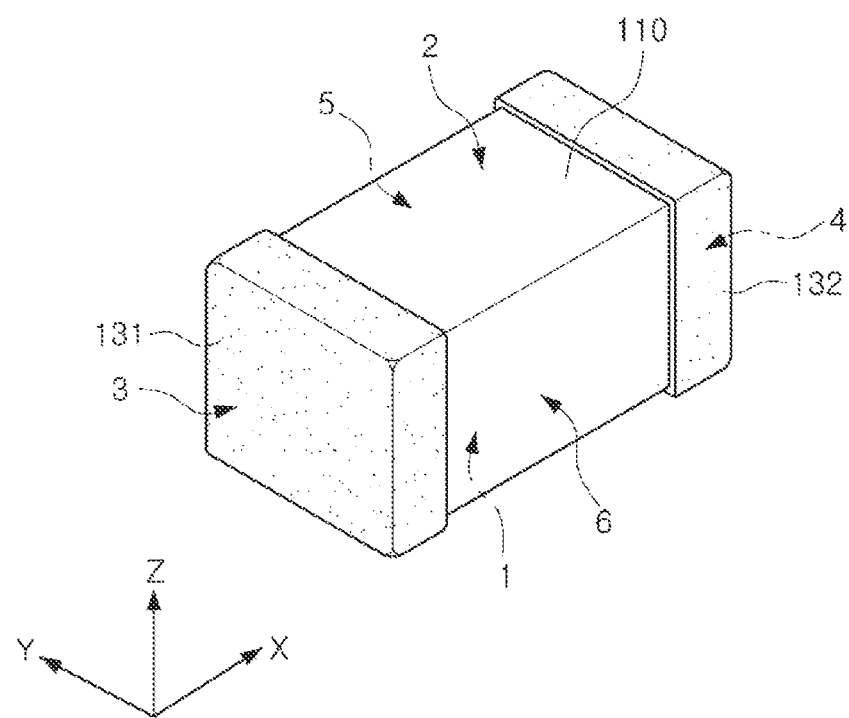
FIG. 1 is a schematic perspective view of a capacitor body and external electrodes applied to an electronic component according to an example embodiment of the present disclosure.

Hereinafter, embodiments of the present disclosure will be described as follows with reference to the attached drawings.

However, the invention may be embodied in many different forms and should not be construed as being limited to the embodiments set forth herein.

Rather, these embodiments are provided so that this disclosure will be thorough and complete, and will fully convey the scope of the invention to those skilled in the art.

Accordingly, the shapes and dimensions of elements in the drawings may be exaggerated for clarity, and the same reference numerals will be used throughout to designate the same or like elements.

Further, the same reference numerals are used throughout the drawings for the elements having similar functions and activities.

In the specification, unless otherwise specifically indicated, when a certain part "includes" a certain component, it is understood that other components may be further included but are not excluded.

To clearly describe the example embodiments, X, Y and Z directions indicated in the drawings are defined to represent a length direction, a width direction and a thickness direction, respectively, of the capacitor body in an electronic component.

Additionally, the Z direction may be oriented in the same direction as a lamination direction in which the dielectric layers are stacked up.

Figure 2A:
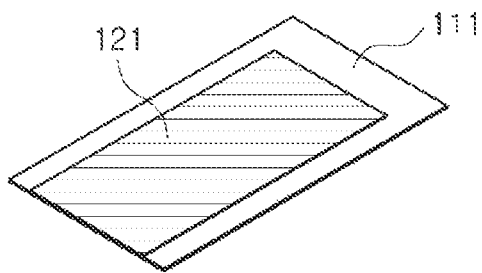
FIGS. 2A and 2B are perspective views of first and second internal electrodes provided in the electronic component of FIG. 1.
Figure 2B:
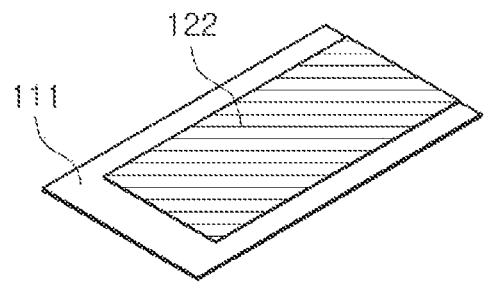
Figure 3:
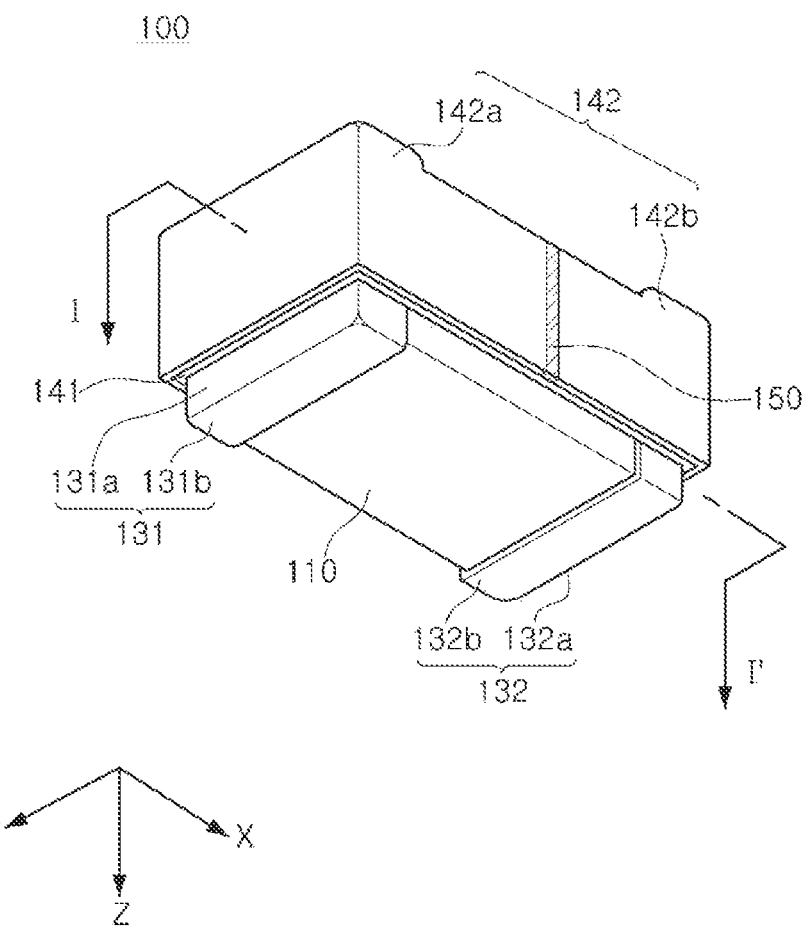
FIG. 3 is a schematic perspective view of the electronic component according to an example embodiment taken from below.
Figure 4:
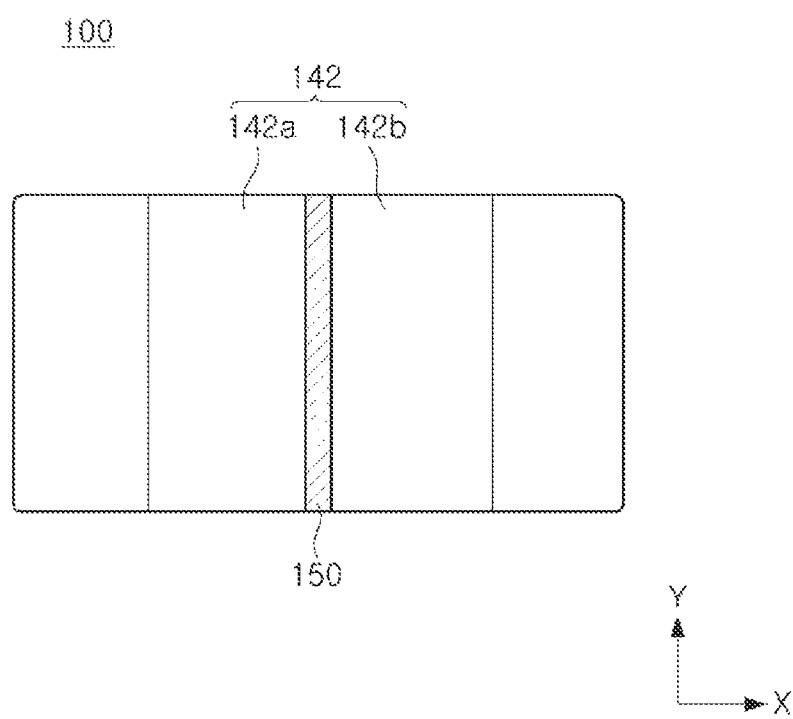
FIG. 4 is a plan view of the electronic component of FIG. 3 shown from above.
Figure 5:
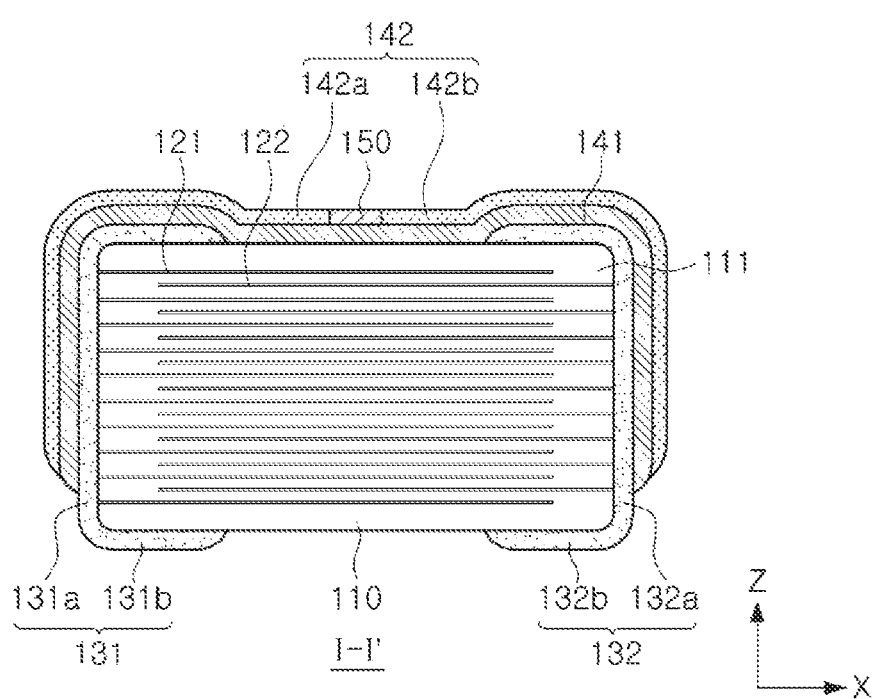
FIG. 5 is a cross-sectional view of the electronic component of FIG. 3 taken along line I-I'.

FIG. 1 is a schematic perspective view of a capacitor body and external electrodes applied to an electronic component according to an example embodiment of the present disclosure, and FIGS. 2A and 2B are perspective views of first and second internal electrodes applied to the electronic component of FIG. 1, while FIG. 3 is a schematic perspective view of the electronic component according to an example embodiment taken from below, FIG. 4 is a plan view of the electronic component of FIG. 3 seen from above, and FIG. 5 is a cross-sectional view taken along line I-I' of FIG. 3.

Hereinbelow, the electronic component of the example embodiments will be described in reference to FIGS. 1, 2A, 2B, and 3 to 5.

Referring to FIGS. 1, 2A, 2B, and 3 to 5, an electronic component 100 of an example embodiment includes a capacitor body 110, first and second external electrodes 131 and 132, a shielding layer 142, and an insulating layer 141.

The capacitor body 110 is formed by laminating a plurality of dielectric layers 111 in the Z direction and sintering. The adjacent dielectric layers 111 of the capacitor body may be integrated with each other so that boundaries therebetween are not readily apparent without using a scanning electron microscope (SEM).

Additionally, the capacitor body 110 includes the plurality of dielectric layers 111 and first and second internal electrodes 121 and 122 having different polarities and alternately stacked or disposed with respective dielectric layers 111 interposed therebetween in the Z direction.

The capacitor body 110 may include an active region in which the first and second internal electrodes 121 and 122 are alternately disposed with respective dielectric layers 111 interposed therebetween as a portion contributing to generation of capacity of a capacitor, and upper portion- and lower portion-cover regions disposed on upper and lower surfaces of the active region in the Z direction as a margin portion. The upper portion- and lower portion-cover regions are free of internal electrodes, and respectively extend above an uppermost internal electrode and below a lowermost internal electrode of the active region.

Such capacitor body 110 is not particularly limited in terms of a configuration thereof, but may be hexahedral. The capacitor body 110 may include a first surface and a second surface 1 and 2 opposing each other (e.g., in the Z direction), a third surface and a fourth surface 3 and 4 connected to the first and second surfaces 1 and 2 and opposing each other in the X direction, and a fifth surface and a sixth surface 5 and 6 connected to the first and second surfaces 1 and 2 and the third and fourth surfaces 3 and 4 and opposing each other (e.g., in the Y direction), where the first surface 1 can be a mounting surface.

The dielectric layers 11 may include ceramic powder, for example, BaTiO$_3$-based ceramic powder, or the like.

The BaTiO$_3$-based ceramic powder may be (Ba$_{1-x}$Ca$_x$)TiO$_3$, Ba(Ti$_{1-y}$Ca$_y$)O$_3$, (Ba$_{1-x}$Ca$_x$)(Ti$_{1-y}$Zr$_y$)O$_3$, or Ba(Ti$_{1-y}$Zr$_y$)O$_3$, or the like, in which calcium (Ca), zirconium (Zr), or the like, is included in BaTiO$_3$, but is not limited thereto.

In addition to the ceramic powder, a ceramic additive, an organic solvent, a plasticizer, a binder, and a dispersant, or the like, may be further included in the dielectric layers 111.

The ceramic additive may include, for example, a transition metal oxide or a transition metal carbide, rare-earth element, magnesium (Mg), aluminum (Al), or the like.

The first and second internal electrodes 121 and 122, electrodes to which different polarities are applied, may be formed on the dielectric layers 111 and laminated in the Z direction and alternately disposed with respective dielectric layers 111 interposed therebetween in the capacitor body 110 in the Z direction.

In this case, the first and second internal electrodes 121 and 122 may be electrically insulated from each other by the dielectric layers 111 disposed therebetween.

The first internal electrode(s) 121 are each exposed through the third surface 3 of the dielectric layer 111 and the second internal electrode(s) 122 are each exposed through the fourth surface 4 of the dielectric layer 111.

End portions of the first and second internal electrodes 121 and 122 alternately exposed through the third and fourth surfaces 3 and 4 of the capacitor body 110 are respectively connected to the first and second external electrodes 131 and 132 disposed on opposing ends of the capacitor body 110 in the X direction, which is described below, so that the first and second internal electrodes 121 and 122 can be respectively electrically connected to the first and second external electrodes 131 and 132.

According to such composition, charges are accumulated between the first and second internal electrodes 121 and 122 when a voltage is applied to the first and second external electrodes 131 and 132.

Capacitance of the multilayer capacitor 100 is proportional to an area of overlap of the first and second internal electrodes 121 and 122, which overlap in the active region in the Z direction.

Further, materials forming the first and second internal electrodes 121 and 122 are not particularly limited, and may be a conductive paste consisting of at least one of a noble metal material or nickel (Ni) and copper (Cu).

A method for printing the conductive paste may be a screen-printing method, a gravure printing method, or the like, but is not limited thereto.

The first and second external electrodes 131 and 132 are provided with a voltage having different polarities, and are disposed on opposing end portions of the body 110 in the X direction. The first and second external electrodes 131 and 132 are respectively connected to portions of the first and second internal electrodes 121 and 122 exposed through the third and fourth surfaces 3 and 4 of the capacitor body 110.

The first and second external electrodes 131 and 132 may include a first connection portion 131a and a first band portion 131b.

The first connection portion 131a is disposed on the third surface 3 of the capacitor body 110 and is in contact with end portion(s) of the first internal electrode(s) 121, which are exposed externally through the third surface 3 of the capacitor body 110, to physically and electrically connect the first internal electrode(s) 121 and the first external electrode 131.

The first band portion 131b extends from the first connection portion 131a to a portion of the first surface 1 of the capacitor body 110.

The first band portion 131b, as appropriate, may further extend toward the second, fifth and sixth surfaces 2, 5 and 6 of the capacitor body 110 for improvement of adhesion strength.

The second external electrode 132 may include a second connection portion 132a and a second band portion 132b.

The second connection portion 132a is disposed on the fourth surface 4 of the capacitor body 110, is in contact with end portion (s) of the second internal electrode (s) 122, which are exposed externally through the fourth surface 4 of the capacitor body 110, to physically and electrically connect the second internal electrode(s) 122 and the second external electrode 132.

The second band portion 132b, as appropriate, may further extend toward the second, fifth and sixth surfaces 2, 5 and 6 of the capacitor body 110 for improvement of adhesion strength.

The insulating layer 141 is disposed between a surface of the capacitor body 110 and the shielding layer 142 and is disposed to cover the second surface 2 entirely and portions of the third, fourth, fifth and sixth surfaces 3, 4, 5 and 6.

A height of the insulating layer 141 in the Z direction is shorter than that of the capacitor body 110 so that portions of lower sides of the third, fourth, fifth and sixth surfaces 3, 4, 5 and 6 of the capacitor body 110 may be exposed.

The insulating layer 141 may include a polystyrene-based, vinyl acetate-based, polyester-based, polyethylene-based, polypropylene-based, polyamide-based, rubber-based or acrylic-based thermoplastic resin, a phenol-based, epoxy-based, urethane-based, melamine-based or alkyd-based thermosetting resin, a photosensitive resin, paraline, SiOx or SiNx.

Further, the insulating layer 141 may be formed of an adhesive layer.

As an example, when the insulating layer 141 and the shielding layer 142 are formed using a shielding sheet including an insulating film and a shield film, the insulating film of a shielding sheet may include an adhesive ingredient, thereby enabling the shield film to adhere to a surface of the capacitor body.

In such case, an adhesive layer may be additionally formed on one surface of the insulating layer 141 between the capacitor body 110 and the one surface of the insulating layer 141.

No additional adhesive layer may be formed on one surface of the insulating layer 141 in such a case in which the insulating layer 141 is formed using a B-stage insulating film.

Such insulating layer 141 may be formed by applying a liquid insulating resin on a surface of the body 110, laminating an insulating film, such as a dry film (DF), on the capacitor body 110, or forming an insulating resin on a surface of the capacitor body 110 by vapor deposition.

For the insulating film, a polyimide film, an Ajinomoto build-up film (ABF) excluding a photosensitive insulating resin may be used.

The shielding layer 142 reduces leakage flux leaking from the electronic component 100 externally, and may include a cap portion disposed on the second surface 2 of the capacitor body 110 and a side wall portion disposed on the third, fourth, fifth and sixth surfaces 3, 4, 5 and 6 of the capacitor body 110.

In other words, the shielding layer 142 is disposed on all surfaces of the capacitor body 110 excluding the first surface 1.

Such shielding layer 142 may be formed to have an integrated form of the cap portion and the side wall portion using the vapor deposition process or by attaching the shielding sheet formed of an insulating film or a shield film to the third, fourth, fifth and sixth surfaces 3, 4, 5 and 6 of the capacitor body 110 or laminating on the second surface 2.

Such shielding layer 142 may include at least one of a conductive material and a magnetic material.

As an example, the conductive material may be a metal including at least one selected from the group consisting of copper (Cu), silver (Ag), gold (Au), aluminum (Al), iron (Fe), silicon (Si), boron (B), chrome (Cr), niobium (Nb) and nickel (Ni) or an alloy. The conductive material may be Fe—Si or Fe—Ni.

Additionally, the shielding layer 142 may include at least one selected from the group consisting of ferrite, permalloy, and an amorphous ribbon.

The shielding layer 142 may be, for example, a copper-deposited layer, but is not limited thereto.

Further, the shielding layer may be a multilayer structure; for example, a double layer structure of a conductive material layer and a magnetic material layer formed thereon, that of a first conductive material layer and a second conductive layer formed on the first conductive material layer, or that of multi-conductive materials.

The first and second conductive layers may include different or the same conductive materials.

Such shielding layer 142 may be divided into two in the X direction connecting the third and fourth surfaces 3 and 4 and thus may consist of first and second shielding layers 142a and 142b. The first and second shielding layers 142a and 142b may be adjacent and offset from each other so as to be non-overlapping on the surface of the body 110.

A gap portion 150 consisting of an insulating film or an oxide film may be provided between the first and second shielding layers 142a and 142b.

The gap portion 150 may be formed by filling an insulating material or oxide in a groove in the shape of a slit.

Such gap portion 150 may prevent occurrence of a short by preventing the first and second shielding layers 142a and 142b from providing a path for an electric current flow therethrough even when a solder is in contact with the shielding layer 142 when mounting the electronic component of the example embodiment on a substrate.

According to an example embodiment, the shielding layer 142 is disposed on the electronic component 100 itself, and thus is distinguished from a shield can, which is connected to a printed circuit board to shield EMI, or the like after mounting the electronic component 100 on the printed circuit board for shielding.

As an example, in contrast to the shield can, it is not necessary to consider connection of the printed circuit board with a ground layer for the shielding layer 142 of the present disclosure.

In addition, the electronic component 100 according to an example embodiment can prevent leakage flux occurring therein while preventing an electrical short between the shielding layer 142 and the first and second external electrodes 131 and 132 by forming the shielding layer 142 in an "∩" shape connecting the cap portion and the side wall portion.

A total number of electronic components 100 included in an electronic device and a distance between adjacent electronic components 100 are decreasing as the electronic devices become slimmer and more highly efficient. In this regard, leakage flux occurring in each electronic component 100 can be more effectively prevented by shielding the electronic component 100 itself, thereby making it more advantageous for the slimming and high performance of the electronic device.

In addition, compared to the case in which the shield can is used, use of the shielding layer 142 facilitates an increase in an amount of effective magnetic materials in a shielded region, thereby improving characteristics of the electronic component 100.

Meanwhile, as shown in FIG. 5, in an example embodiment, when the band portions 131b and 132b of the first and second external electrodes 131 and 132 extend to a part of the second surface 2 of the capacitor body 110, the insulating layer 141 and the shielding layer 142 may have a shape in which a center portion is concave on the second surface 2 between the first and second band portions 131b and 132b of the first and second external electrodes 131 and 132.

Figure 6:
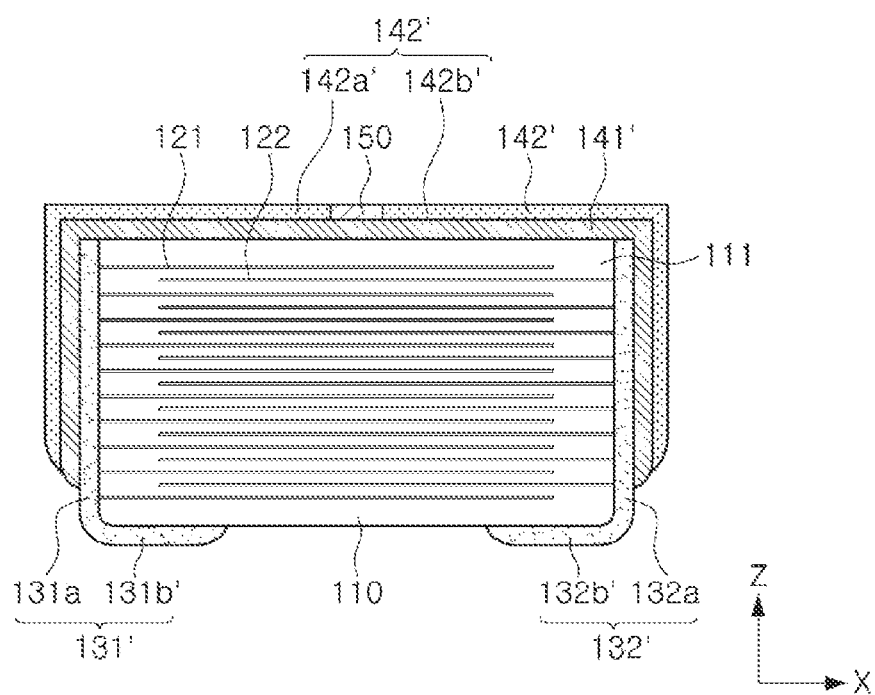
FIG. 6 is a cross-sectional view of another example of the external electrodes.

In contrast, as shown in FIG. 6, first and second band portions 131b' and 132b' of first and second external electrodes 131' and 132' may not be formed on the second surface 2 of the capacitor body 110.

In this case, an insulating layer 141' covers an upper surface of the capacitor body 110 while being in close contact with the entire second surface 2 of the capacitor body 110, and a shielding layer 142' formed on the insulating layer 141' and including first and second shielding layers 142a' and 142b' may also have a flat top surface.

Figure 7:
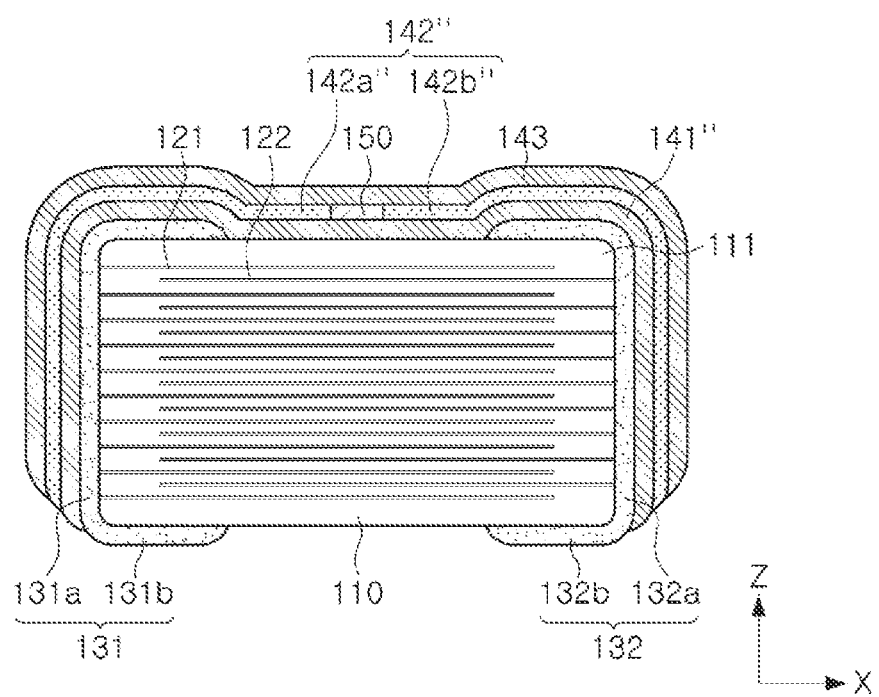
FIG. 7 is a cross-sectional view of an additionally formed cover layer.

Referring to FIG. 7, an electronic component of an example embodiment may further include a cover layer 143 disposed on the shielding layer 142" to cover first and second shielding layers 142a" and 142b" and the gap portion 150.

The cover layer 143 is disposed on the shielding layer 142" to cover the shielding layer 142" while exposing an end portion of the shielding layer 142".

Such cover layer 143 may include a polystyrene-based, vinyl acetate-based, polyester-based, polyethylene-based, polypropylene-based, polyamide-based, rubber-based or acrylic-based thermoplastic resin, a phenol-based, epoxy-based, urethane-based, melamine-based or alkyd-based thermosetting resin, a photosensitive resin, paraline, SiOx or SiNx.

Further, the cover layer 143 may be formed simultaneously with the insulating layer 141" and the shielding layer 142" disposing an insulating film of a shielding sheet consisting of an insulating film, a shield film, and a cover film to face the capacitor body and laminating the shielding sheet on the capacitor body.

As another example, the cover layer 143 may be formed by laminating a cover film on the shielding layer 142 formed on the capacitor body 110. As another example, the cover layer 143 may be formed on the second to sixth surfaces of the capacitor body 110 by forming an insulating material by vapor deposition such as chemical vapor deposition (CVD), or the like.

The cover layer 143 may have an adhesive function. For example, a cover film in a shielding sheet consisting of an insulating film, a shield film, and a cover film may have an adhesive ingredient to adhere to the shield film.

The insulating layer 141" and the shielding layer 142" may be formed so that lower portions thereof extend to a lower end of the first and second connection portions 131a and 132a to substantially cover the first and second connection portions 131a and 132a of the first and second external electrodes 131 and 132.

According to the present disclosure, leakage flux of an electronic component is reduced and component characteristics are substantially retained.

In addition, by dividing the shielding layer into a portion in contact with the cathode and a portion in contact with the anode, a short between a solder and an EMI-shielding layer can be prevented when mounting the electronic component.

While example embodiments have been shown and described above, it will be apparent to those skilled in the art that modifications and variations could be made without departing from the scope of the present disclosure as defined by the appended claims.

What is claimed is:

1. An electronic component, comprising:
a capacitor body comprising alternately stacked first internal electrodes and second internal electrodes with dielectric layers therebetween, and a first surface and a second surface opposing each other, a third surface and a fourth surface connected to the first and second surfaces and opposing each other, and a fifth surface and a sixth surface connected to the first, second, third, and fourth surfaces and opposing each other, the first internal electrodes and the second internal electrodes being exposed through the third surface and the fourth surface, respectively;
first and second external electrodes respectively extending from the third and fourth surfaces of the body to respective portions of the first surface and respectively connected to the first and second internal electrodes;
a shielding layer including first and second shielding layers disposed on respective portions of the capacitor body to be spaced apart from each other by a gap in the length direction; and
an insulating layer disposed between the capacitor body and the shielding layer;
wherein an insulator filling the gap between the first and second shielding layers extends across the second surface and along the fifth and sixth surfaces.

2. The electronic component of claim 1, wherein the shielding layer comprising a cap portion disposed on the second surface of the capacitor body and a side wall portion disposed on the third, fourth, fifth and sixth surfaces of the capacitor body.

3. The electronic component of claim 1, further comprising a cover layer disposed on the shielding layer and formed of an insulating material.

4. The electronic component of claim 1, wherein the first and second external electrodes comprise:
first and second connection portions respectively disposed on the third and fourth surfaces of the capacitor body and respectively connected to the first and second internal electrodes; and
first and second band portions respectively extending from the first and second connection portions to the respective portions of the first surface of the capacitor body.

5. The electronic component of claim 4, wherein the second surface of the capacitor body is free of the first and second external electrodes, and the insulating layer and the shielding layer have flat surfaces overlaying the second surface.

6. The electronic component of claim 4, wherein the first and second band portions further extend to respective portions of the second, fifth, and sixth surfaces of the capacitor body.

7. The electronic component of claim 6, wherein the respective portions of the second, fifth, and sixth surfaces of the capacitor body having the first and second band portions extending thereon are overlapped by the insulating layer and the shielding layer.

8. The electronic component of claim 1, wherein the insulating layer is formed of an adhesive layer.

9. An electronic component comprising:
a capacitor body comprising alternately stacked first internal electrodes and second internal electrodes with dielectric layers therebetween;
first and second external electrodes, respectively connected to the first and second internal electrodes, and disposed to be spaced apart from each other in a length direction on a first surface of the capacitor body; and
first and second shielding layers disposed on respective portions of the capacitor body to be spaced apart from each other by a gap in the length direction,
wherein an insulator fills the gap between the first and second shielding layers.

10. The electronic component of claim 9, further comprising an insulating layer disposed between the capacitor body and the first and second shielding layers.

11. The electronic component of claim 9, wherein the first and second shielding layers include at least one of a conductive material and a magnetic material.

12. The electronic component of claim 9, wherein the first and second shielding layers include a conductive material and a magnetic material.

13. The electronic component of claim 9, wherein the first and second shielding layers jointly extend on all surfaces of the capacitor body other than the first surface of the capacitor body.

14. The electronic component of claim 9, wherein the first shielding layer overlaps with portions of the first external electrode, and the second shielding layer overlap with portions of the second external electrode.

15. The electronic component of claim 14, wherein all portions of surfaces of the capacitor body overlapped by the first shielding layer are spaced away from the second external electrode, and all portions of surfaces of the capacitor body overlapped by the second shielding layer are spaced away from the first external electrode.

16. The electronic component of claim 15, wherein the all portions of surfaces of the capacitor body overlapped by the gap are spaced apart from the first and second external electrodes.

17. The electronic component of claim 9, wherein the capacitor body has a second surface opposing the first surface, third and fourth surfaces opposing each other in the length direction and connecting the first and second surfaces, and fifth and sixth surfaces opposing each other and connecting the first, second, third, and fourth surfaces, and
the insulator filling the gap between the first and second shielding layers extends across the second surface and along the fifth and sixth surfaces.

18. The electronic component of claim 1, each dielectric layer includes $BaTiO_3$, $(Ba_{1-x}Ca_x)TiO_3$, $Ba(Ti_{1-y}Ca_y)O_3$, $(Ba_{1-x}Ca_x)(Ti_{1-y}Zr_y)O_3$, or $Ba(Ti_{1-y}Zr_y)O_3$, in which calcium (Ca), zirconium (Zr), is included in $BaTiO_3$.

19. The electronic component of claim 1, wherein the insulating layer is disposed to cover the entire second surface and at least a portion of the third, fourth, fifth, and sixth surfaces of the capacitor body.

20. The electronic component of claim 1, wherein the insulating layer includes a thermoplastic resin, a thermosetting resin, a photosensitive resin, a PARA resin, $SiO_x$ or $SiN_x$,
the thermoplastic resin includes at least one selected from a polystyrene-based resin, a vinyl acetate-based resin, a polyester-based resin, a polyethylene-based resin, a polypropylene-based resin, a polyamide-based resin, a rubber-based resin and an acrylic-based resin, and
the thermosetting resin includes at least one selected from a phenol-based, an epoxy-based, a urethane-based, a melamine-based and an alkyd-based resin.

21. The electronic component of claim 1, wherein the shielding layer is an electronic component integrally formed with a cap portion and a sidewall portion on the insulating layer.

22. The electronic component of claim 1, wherein the shielding layer includes a metal including at least one selected from the group consisting of copper (Cu), silver (Ag), gold (Au), aluminum (Al), iron (Fe), silicon (Si), boron (B), chrome (Cr), niobium (Nb), nickel (Ni), and alloys thereof.

23. The electronic component of claim 1, wherein the shielding layer includes Fe—Si or Fe—Ni.

24. The electronic component of claim 1, wherein the shielding layer includes at least one selected from the group consisting of ferrite, permalloy, and an amorphous ribbon.

25. The electronic component of claim 1, wherein the shielding layer is a double layer structure, and includes a first conductive material layer and a second conductive material layer.

26. The electronic component of claim 4, wherein the first and second band portions of the first and second external electrodes are not formed on the second surface of the capacitor body.

27. The electronic component of claim 4, wherein the first and second band portions of the first and second external electrodes are formed on the second surface of the capacitor body, and
the insulating layer and the shielding layer have a shape in which a middle portion is concave by the first and second band portions of the first and second external electrodes.

28. The electronic component of claim 3, wherein the cover layer includes a thermoplastic resin, a thermosetting resin, a photosensitive resin, a PARA resin, $SiO_x$, or $SiN_x$,
the thermoplastic resin includes at least one selected from a polystyrene-based resin, a vinyl acetate-based resin, a polyester-based resin, a polyethylene-based resin, a polypropylene-based resin, a polyamide-based resin, a rubber-based resin and an acrylic-based resin, and
the thermosetting resin includes at least one selected from a phenol-based resin, and epoxy-based resin, a urethane-based resin, a melamine-based resin and an alkyd-based resin.

29. The electronic component of claim 3, wherein the cover layer includes an adhesive function.

30. The electronic component of claim 3, wherein the cover layer covers the shielding layer so as to expose the end of the shielding layer.

* * * * *